United States Patent [19]
Kokush

[11] Patent Number: 5,856,862
[45] Date of Patent: Jan. 5, 1999

[54] BOOM CAMERA CRANE

[76] Inventor: Anatoly Akimovich Kokush, 252216 Kiev, ul., Geroev Stalingrada 26 kv. 239, Ukraine

[21] Appl. No.: 722,109
[22] PCT Filed: Apr. 14, 1995
[86] PCT No.: PCT/UA95/00002
§ 371 Date: Sep. 26, 1996
§ 102(e) Date: Sep. 26, 1996
[87] PCT Pub. No.: WO95/30174
PCT Pub. Date: Nov. 9, 1995

[30] Foreign Application Priority Data

Apr. 29, 1994 [UA] Ukraine .................................. 94042097

[51] Int. Cl.$^6$ ..................................................... B66C 23/54
[52] U.S. Cl. ............................................................. 352/243
[58] Field of Search .................... 352/243; 212/195–199, 212/227, 239, 256, 347, 317, 321

[56] References Cited

U.S. PATENT DOCUMENTS

| | | | |
|---|---|---|---|
| 4,113,112 | 9/1978 | Ray | 212/71 |
| 4,303,166 | 12/1981 | Campbell et al. | 212/233 |
| 4,363,411 | 12/1982 | Blair et al. | 212/195 |
| 4,685,649 | 8/1987 | McKay | 248/594 |
| 5,033,705 | 7/1991 | Reagan | 248/123.1 |

*Primary Examiner*—Daniel P. Malley
*Attorney, Agent, or Firm*—Ilya Zborovsky

[57] ABSTRACT

A boom camera crane for film-and television-program shooting has a support; a boom turnable in vertical and horizontal planes, and a carriage for supporting a camera and reciprocatingly movable on the boom along the boom.

5 Claims, 2 Drawing Sheets

BOOM CAMERA CRANE

BACKGROUND OF THE INVENTION

The present invention relates to machines for lifting loads, and in particular to machines to be used for movement of a camera during film-or television-program shooting.

A camera crane is known (RU-A-2,028,271) which has a boom arranged on a support so as to be turnable in vertical and horizontal planes and composed of at least two parts connected with one another by additional couplings. The crane also has a cantilever with a system of crane boom mass compensation (the counterbalance), central and lateral struts with rope pulleys on their end, and tension wires extending around the pulleys and having first ends connected with tensioning mechanisms arranged on the end of the cantilever and second ends connected with the additional couplings.

The device disclosed in this reference has a disadvantage that the camera arranged on the crane can be moved only in the vertical and horizontal planes so as to follow all movements of the end of the crane boom. Therefore, it can not provide use which are necessary for shooting an object located within a hemisphere circumscribed by an end of a crane boom radius.

SUMMARY OF THE INVENTION

Accordingly, it is an object of the present invention to provide a device which makes possible shooting an object at any point within the hemisphere circumscribed by the end of the crane boom radius.

In keeping with these objects, one feature of the present invention resides, briefly stated, in a boom camera crane, which has a support, a boom arranged on the support end and turnable in vertical and horizontal planes, and an additional carriage arranged on the boom for supporting a camera and reciprocatingly movable along the boom.

When the device is designed in accordance with the present invention, it elements the disadvantages of the prior art. The mass center of the boom is kept constant relative to its hinge for turning in a vertical plane, while the camera reciprocatingly moves along the boom of the crane.

The carriage with the camera can be connected by a rope-pulley system with a counterbalance arranged on rollers inside the hollow crane boom, with portions of outer and inner boom surfaces operating as guides for the carriage rollers and counterbalance rollers along the whole length of the boom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
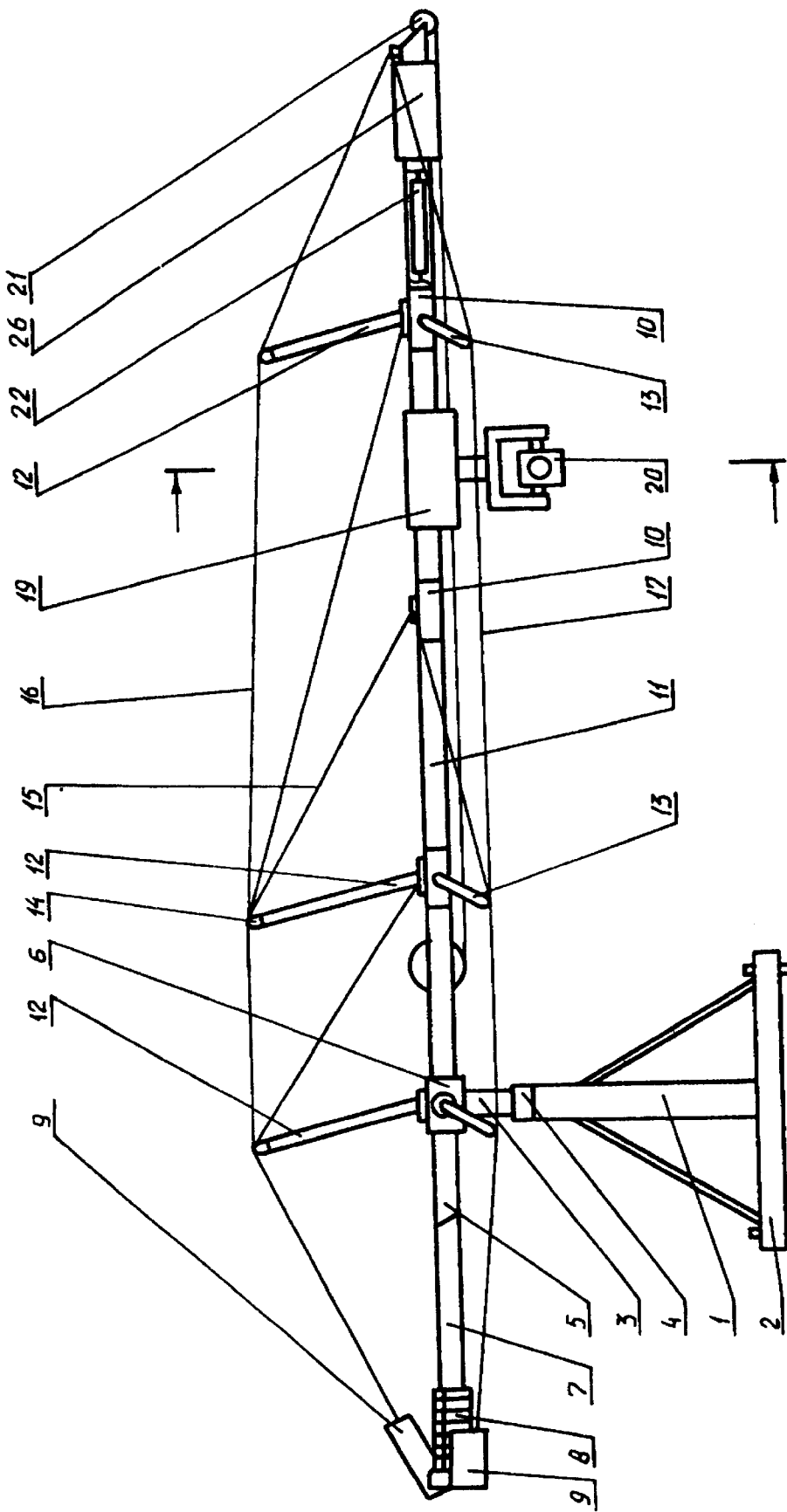
FIG. 1 is a side view of a boom camera crane in accordance with the present invention.

A boom camera crane in accordance with the present invention has a support 1 provided with a fixed base 2. A column 3 is connected with a support 1 by a bearing unit 4 so that the column 3 can turn around a vertical axis of the support 1. A central section 5 is turnably mounted on the column 3 through a bearing unit 6 for turning in a vertical plane. A cantilever 7 is connected with one end of the central section 5 and provided with a counterbalance 8 or a boom mass compensation element. A tensioning mechanism 9 is arranged on the cantilever 7 as well.

Several sections of an assembled hollow boom 11 are attached to the other side of the central section 5 by connecting couplings 10. The crane has central struts 12 and lateral struts 13. The free ends of the struts are provided with guides 14 for laying of tension wires 15. The tension wires 15 have one end fastened to the connecting couplings 10 and another end fastened to the tensioning mechanisms for tensioning the central and lateral tension wires 16 and 17 correspondingly.

Figure 2:
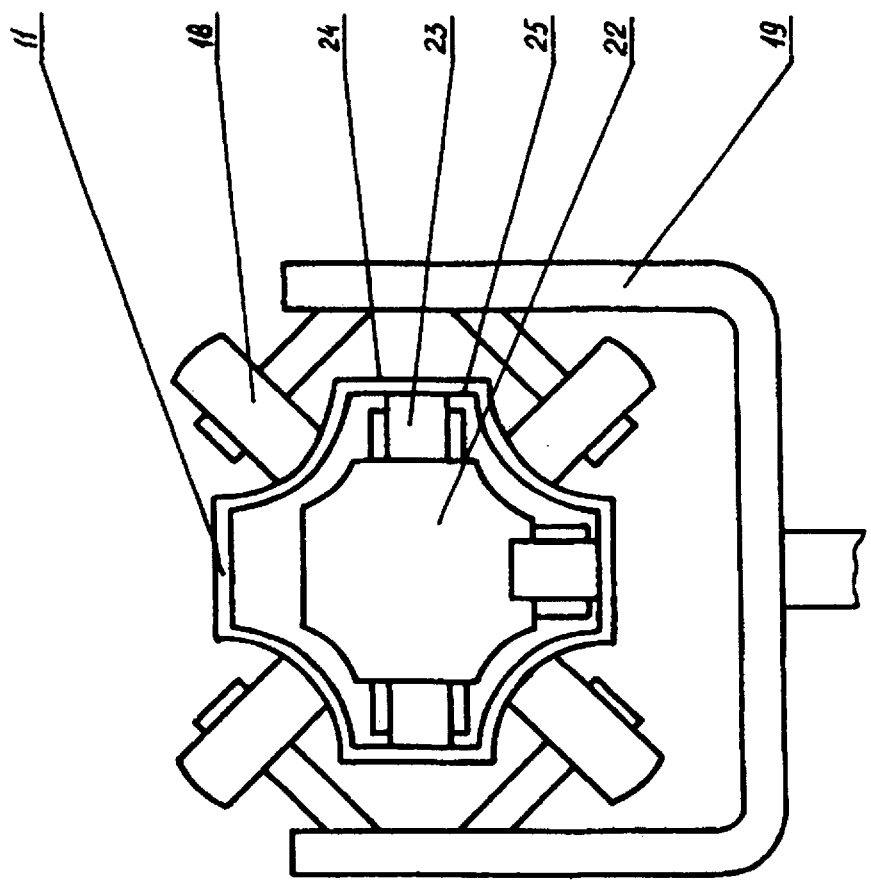
FIG. 2 is a view showing a section of a crane boom of the inventive boom camera crane, taken along the line A—A.

The boom 11 is formed as a hollow element which can be assembled of at least two parts. A carriage 19 with a camera 20 is arranged on the boom 11 with interposition of rollers 18 as shown in FIG. 2. The carriage is connected by a rope-pulley system 21 with a counterbalance 22 arranged inside the hollow boom 11 with interposition of rollers 23. The hollow boom 11 has outer surfaces 24 and inner surfaces 25 which operate as guides for the rollers 18 of the carriage 19 with the camera 20 and also for the rollers 23 of the counterbalance 22 along the whole length of the boom 11.

A trolley 26 is arranged on the hollow boom 11 for picking up and tensioning of a connecting cable for the camera 20.

The device in accordance with the present invention operates in the following manner:

The camera 20 is mounted on the carriage 19 with the rollers 18 on the end of the hollow boom 11 of the crane while an object for shooting is placed at a distance from the hollow boom 11 within a boom turning angle and on an opposite part of the boom, close to the counterbalance 8. In order to choose an appropriate view for shooting of the object, a cameraman turns the boom 11 toward the object and translates the camera 20 along the outer guides 24 of the boom 11 toward the object, i.e. to the counterbalance 8. Simultaneously with the translation of the camera 20, the counterbalance 22 moves on the rollers 23 in the opposite direction toward the end of the boom along the inner guides 25 of the boom 11. Therefore the center of mass of the boom 11 is kept constant relative to the bearing unit 6 for turning the boom in the vertical plane. The camera is displaced until the desired view for shooting of an object is achieved.

I claim:

1. A boom camera crane for film-and television-program shooting, comprising a support; a hollow boom turnable in vertical and horizontal planes on said support via a bearing unit, said hollow boom having one part located at one side of said bearing unit and another part located at another side of said bearing unit; a carriage supporting a camera and reciprocatingly movable on said boom along said boom, said carriage being located on said one side of said boom and being reciprocatingly movable along said one side of said boom; and a counterbalance connected with said carriage supporting said camera for counter balancing said carriage with said camera during the reciprocating movement of said carriage with said camera along said one part of said boom, said counter balance being reciprocatingly movable inside said boom in said one part of said boom, so that when said carriage with said camera moves along said one part of said boom in one direction said counterbalance connected with said carriage moves in another opposite direction inside said one part of said boom.

2. A boom camera crane as defined in claim 1, wherein said boom is formed as a hollow boom assembled of at least two parts.

3. A boom camera crane as defined in claim 1, wherein said one part of said boom has outer surfaces, said carriage being provided with rollers which are guided on said outer surfaces of said one part of said boom during the reciprocating movement of said camera along said boom.

4. A boom camera as defined in claim 3, wherein said one part of said boom has inner surfaces, said counterbalance being provided with rollers which are guided on said inner surfaces of said one part of said boom.

5. A boom camera as defined in claim 1, wherein said carriage is provided with rollers which are guided over outer surfaces of said one part of said boom during the reciprocating movement of said carriage, said counterbalance being provided with rollers which are guided over inner surfaces of said one part of said boom during movement of said counterbalance.

* * * * *